Dec. 8, 1953  J. H. NELSON  2,661,745
PEA THRESHER HAVING SPRING ACTUATED BEATERS
Filed April 18, 1952
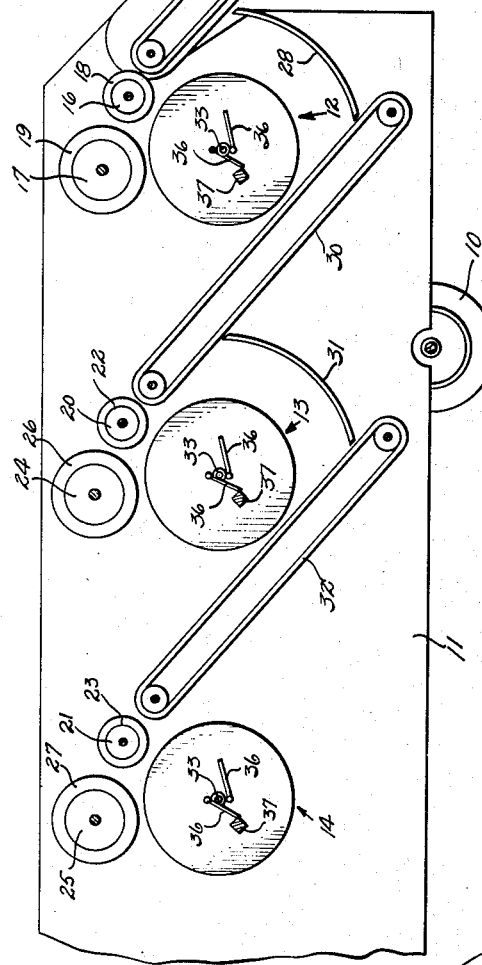
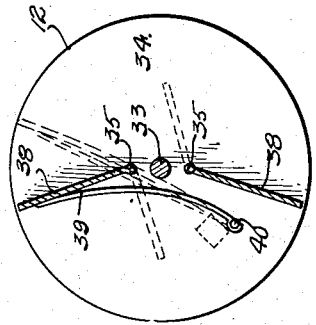
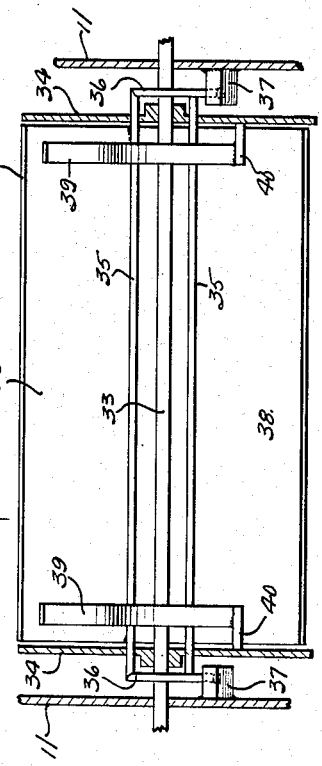
INVENTOR.
John H. Nelson Patented Dec. 8, 1953

2,661,745

UNITED STATES PATENT OFFICE 2,661,745

PEA THRESHER HAVING SPRING ACTUATED BEATERS

John H. Nelson, Valders, Wis.

Application April 18, 1952, Serial No. 282,963

1 Claim. (Cl. 130—30)

The present invention relates to a combine and it consists in the combinations, constructions and arrangements of parts herein described and claimed.

Generally there is provided a combine consisting of an elongated body having a plurality of cylinders extending thereacross in longitudinally spaced relation to one another. Crops such as beans, green peas, grain or seeds are fed to the apparatus first through an endless conveyor which, in turn, delivers the same to a pair of feed rollers which then deliver the same to the first of the cylinders. From each cylinder the treated crop is then led forwardly and upwardly by another endless conveyor to a duplicate of the first mentioned cylinder and its attendant mechanisms, each of the cylinders moving at a progressively greater speed than its predecessor. Within each of the cylinders there is provided a novel arrangement of beaters with novel means provided for actuating the same so as to readily separate beans, peas or the like from their respective pods or shells as the case may be.

It is accordingly an object of the invention to provide a novel combine having novel and efficient means for separating the component parts of a crop.

Another object of the invention is to provide an apparatus of the character set forth which is simple in construction, inexpensive to manufacture and yet effective and efficient in use.

Another object of the invention is to provide, in a device of the character set forth, novel actuating means for beater plates forming a part of the invention.

Other and further objects of the invention will become apparent from a reading of the following specification taken in conjunction with the drawing, in which:

Figure 1 is a side elevational view of an apparatus constructed in accordance with the teachings of the present invention, Figure 2 is an enlarged fragmentary vertical sectional view thereof, and Figure 3 is a sectional view taken along line 3—3 of Figure 2.

Referring more particularly to the drawing, there is shown therein a combine of the character set forth having a body supported by wheels 10 and which body includes a pair of side walls 11. Adjacent the rear of the apparatus there is provided a cylinder generally designated at 12 which cylinder extends transversely of the apparatus. Forwardly of the cylinder 12 there is an identical cylinder 13 and forwardly of the cylinder 13 is a further identical cylinder generally designated at 14. A forwardly and upwardly extending endless conveyor 15 is affixed to the rear portion of the apparatus and has mounted adjacent thereto a relatively small transversely extending feed roller 16 and a relatively large transversely extending feed roller 17. The rollers 16 and 17 are each provided with a rubber covering, as indicated at 18 and 19, respectively.

Above each of the cylinders 13 and 14, in each case, there is transversely mounted a relatively small roller 20 and 21, respectively, each of which is rubber coated, as indicated at 22 and 23, respectively, and there is also mounted a relatively large roller 24 and 25 each of which is rubber coated, as indicated at 26 and 27, also respectively, it being understood that the rollers 20 and 21 are identical with the roller 16 and that the rollers 24 and 25 are identical with the roller 17. A transversely extending forwardly dependent shield 28 extends from the rear of the combine to a point immediately above the lower portion of an endless conveyor 30 which extends upwardly to a point adjacent the roller 20 and a like shield 31 extends from a point beneath the upper portion of the endless conveyor 30 to a point adjacent the top of the lower portion of a conveyor 32 which is identical with the conveyor 30 and which extends upwardly to a point adjacent the roller 21.

In Figure 2 there is shown one of the cylinders 12, 13 and 14, and, since all are identical, the cylinder 12 will now be described. The cylinder 12 is mounted upon a transversely extending shaft 33 and is of hollow cylindrical construction and provided with end walls 34. Transversely extending through the end walls 34 in spaced relation to the shaft 33 and at diametrically opposed points with relation to the shaft 33 is a pair of beater shafts 35 each of which is provided at each of its outer ends with a crank arm 36. A block 37 is affixed to each of the walls 11 upon the inner side thereof and each is so positioned that it lies in the normal path of rotation of the outer ends of the arms 36.

Affixed to each of the beater shafts 35 is an outwardly extending beater plate 38 and each of the plates 38 bear against a flat spring 39, Fig. 2, affixed at one of its ends to an inwardly extending arm 40 which is affixed to the end wall 34 adjacent thereto.

In operation, it will be apparent that a cut crop to be treated by the combine of the present invention is first placed upon the endless conveyor 15 and led thereby to the feed rollers 16 and 17 and as each portion of the crop reaches the feed rollers 16 and 17 a portion of it is fed downwardly to the cylinder 12 and will periodically be struck by one of the beater plates 38. This comes about through the action of the crank arms 36 which, when the outer ends thereof impinge against the blocks 37 will hold back their associated beater plates 38 against the action of the springs 39 until the ends of the same are freed from the blocks 37 through the rotation of the shaft 33. The springs 39 will then act to violently impact the plate 38 against the portion of the crop thus fed through the rollers 16 and 17 thus freeing the peas, beans or the like from the chaff and dropping the whole upon the plate 28 where the same is then fed by the endless conveyor 30 to the rollers 20 and 24 where the process is repeated with the cylinder 13. This, accomplished, the thus treated crop is now fed by the endless conveyor 32 to the feed rolls 20 and 25 and the process repeated again by the cylinder 14. However, it should be understood that the cylinder 12 is revolving at a rather slow rate of speed while the cylinder 13 revolves a little more rapidly and the cylinder 14 revolves at a still more rapid rate. Thus it will be apparent that the tender peas and beans may be separated from the chaff in the first cylinder 12 while the cylinders 13 and 14 will act to separate those peas, beans and the like which are not quite so tender.

It will also be understood that instead of the crank arms 36 and blocks 37 that an arrangement of cams may be utilized to actuate the springs 39 and beater plates 38.

While but one form of the invention has been shown and described herein, it will be readily apparent to those skilled in the art that many minor modifications may be made without departing from the spirit of the invention or the scope of the appended claim.

What is claimed is:

An apparatus of the character described comprising a body including a pair of side walls, a plurality of transversely extending, longitudinally-spaced cylinders, each of which having a drive shaft journalled in said side walls, a pair of transversely extending cooperating feed rollers lying above the cylinder and journalled in said side walls, an endless conveyor extending to each pair of feed rollers to deliver vines thereto, a shield interconnecting said side walls and extending between each adjacent pair of endless conveyors and from a point beneath a rearward conveyor to a point above a forward conveyor of each adjacent pair of conveyors and below a cylinder, each of said cylinders having end walls, a pair of beater shafts extending through said cylinder and end walls in spaced parallel, diametrically opposed relation to said drive shaft, beater plates carried by the respective shafts and extending in opposite directions from one another, a crank arm fixed to each end of each beater shaft, an inwardly extending block mounted on each side wall of said body in the path of movement of the outer ends of said crank arms, and pairs of springs carried by said end walls of the cylinder and each pair of springs bearing against one side of one of said beater plates to violently impact the same against a portion of the vine crop fed to the cylinders from said feed rollers.

JOHN H. NELSON.

References Cited in the file of this patent

UNITED STATES PATENTS

| Number | Name | Date |
| --- | --- | --- |
| 17,819 | Chichester | July 14, 1857 |
| 526,869 | Paterson | Oct. 2, 1894 |
| 2,084,935 | Bott | June 22, 1937 |